Aug. 7, 1934.  U. L. SUNDBLAD  1,969,241
MOTOR VEHICLE CLOCK
Filed Jan. 26, 1934
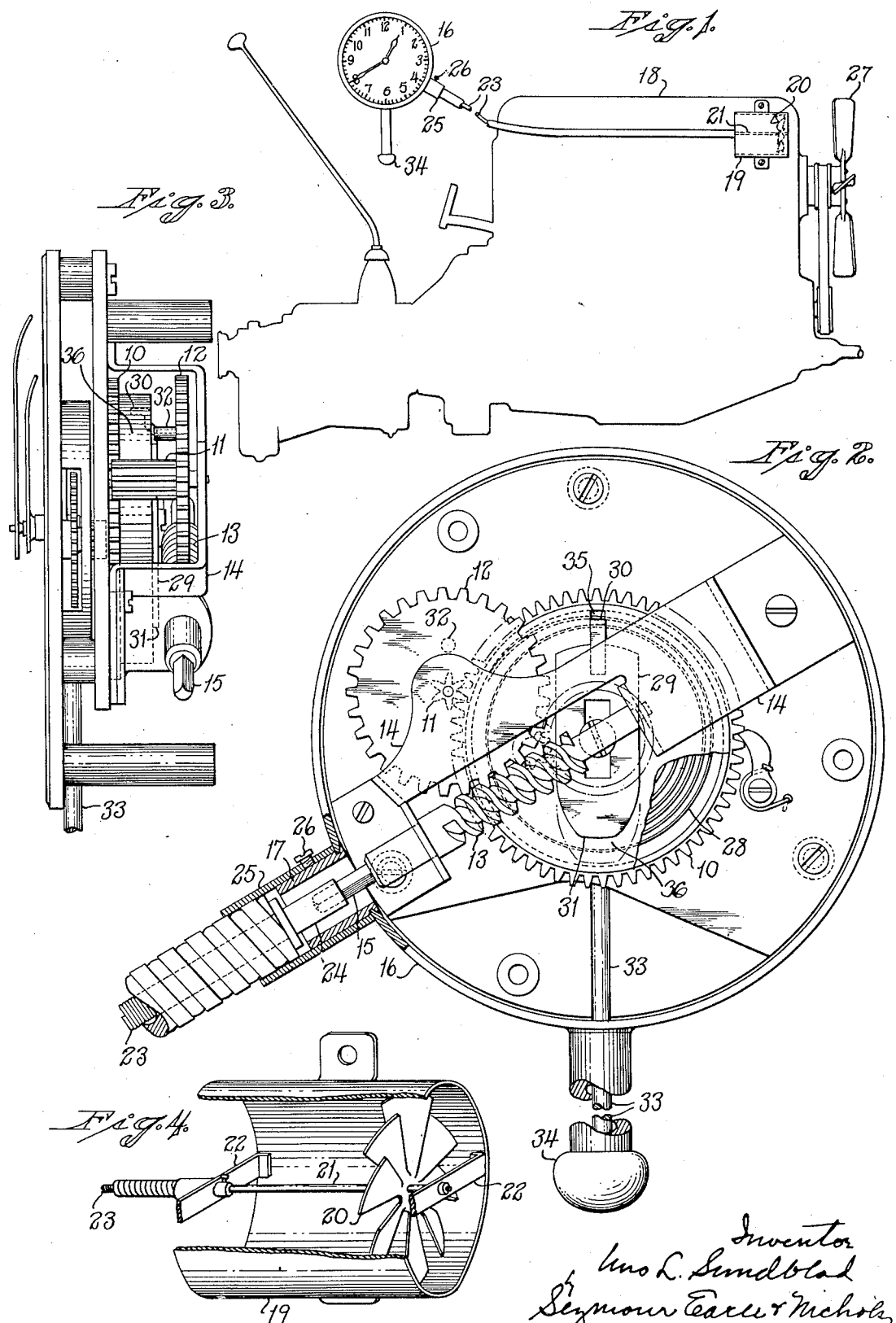

Patented Aug. 7, 1934

1,969,241

UNITED STATES PATENT OFFICE 1,969,241

MOTOR VEHICLE CLOCK

Uno L. Sundblad, Hamden, Conn.

Application January 26, 1934, Serial No. 708,387

3 Claims. (Cl. 58—46)

This invention relates to an improvement in motor vehicle clocks, particularly clocks for motor vehicles having means including a fan or any mechanical or electrical stop-motor producing a current of air, the object being to provide means for winding the clock from currents of air from the stop-motor, with means to prevent overwinding, and the invention consists in the construction as hereinafter described and particularly recited in the claims.

In the accompanying drawing:

Fig. 1 is a diagrammatic view indicating the relative location of the several parts of my invention;

Fig. 2 is an enlarged view, partly in section, illustrating a sufficient portion of a timing mechanism to illustrate my winding mechanism in connection therewith;

Fig. 3 is a side view of the same; and

Fig. 4 is a broken perspective view of the air-motor, detached.

In carrying out my invention, I employ a clock mechanism of substantially-usual form, comprising a main winding-wheel 10 into which meshes a pinion 11 carried by a worm-wheel 12, this worm-wheel being engaged by a worm-screw 13 mounted in a bridge 14 and having an angular stem 15 which projects beyond the clock-casing 16 and preferably into a sleeve 17.

Mounted on the motor 18 is a cylindrical housing 19 having a stop-motor 20 (in the path of currents of air from the usual motor-fan 27), which is fixed to a shaft 21 mounted in cross-braces 22 at opposite ends of the housing 19, and this shaft is connected with a flexible shaft 23 having a socket-end 24 to engage with the angular end 15 of the worm-wheel, and preferably provided with a collar 25 which sets over the sleeve 17 to which it may be secured by a screw 26 so as to firmly connect the flexible shafting with the worm.

Currents of air from the motor-fan 27 act upon the stop-motor so as to revolve the flexible shaft 23 and turn the worm-screw 13, so that, through the worm-wheel 12, the spring 28 in the spring-drum 36 will be wound. To prevent overwinding of the spring, I employ a slide 29 having a finger 30 extending through a radial slot 35 in the spring-drum 36 between the convolutions of the spring and so as to be moved in one direction when the spring is wound, and moved in the opposite direction as the spring unwinds, and this slide has a nose 31 which, when the spring is nearly fully wound, will extend into the path of a stop-pin 32, preferably carried by the worm-wheel 12 and so that when the spring is sufficiently wound, the nose 31 will project into the path of the pin 32 so as to be arrested thereby, thus stopping further movement of the worm-wheel with respect to the main winding-wheel.

The setting mechanism may be operated by the usual setting-stem 33 provided with a finger-piece 34, and the clock may be mounted on the dashboard of an automobile or at any other convenient point and is not only capable of use with an automobile, but with other air-cooled motor vehicles.

In use with a motor vehicle, when the vehicle is being used, the clock is being wound and may be wound to such an extent as to run for eight days or longer without rewinding, and usually the motor vehicles are used sufficiently to keep the clock wound, but if the vehicle is not used, there will be no necessity of keeping the clock running.

I claim:

1. The combination with a motor vehicle having means for creating a current of air, of a stop-motor in the path of currents of air, combined with clock mechanism, including a spring-drum, a spring therein, a main winding-wheel, a pinion meshing therewith, a worm-wheel carried by said pinion, a worm operating the worm-wheel, a flexible shafting between the worm and the stop-motor, whereby the movement of the motor will wind the clock, a stop-pin, and a stop-member movable relatively to said stop-pin and movably mounted on the spring-drum and moved by the spring and adapted, when projected, to contact with the said stop-pin.

2. The combination with a motor vehicle having a fan, of a stop-motor mounted in the path of currents of air from the fan, combined with a clock mechanism including a spring-drum, a spring therein, a main winding-wheel, a pinion meshing therewith, a worm-wheel carried by said pinion, a bridge, a worm mounted in said bridge and engaging with the worm-wheel, a flexible connection between the worm and the stop-motor, a stop-pin, and a stop-member movable relatively to said stop-pin and movably mounted on the spring-drum and moved by the spring and adapted, when projected, to contact with the said stop-pin.

3. The combination with a motor vehicle having means for creating a current of air, of a stop-motor in the path of currents of air, combined with clock mechanism, including a spring-drum, a spring therein, a main winding-wheel, a pinion meshing therewith, a worm-wheel carried by said pinion, a stop-pin on said worm-wheel, a worm operating the worm-wheel, a flexible shafting between the worm and the stop-motor, whereby the movement of the motor will wind the clock, and a stop-member movably mounted on the spring-drum and moved by the spring and adapted, when projected, to contact with the said stop-pin.

UNO L. SUNDBLAD.